(12) United States Patent
Gomez et al.

(10) Patent No.: US 9,187,811 B2
(45) Date of Patent: Nov. 17, 2015

(54) LOW-CARBON CHROMIUM STEEL HAVING REDUCED VANADIUM AND HIGH CORROSION RESISTANCE, AND METHODS OF MANUFACTURING

(71) Applicant: Tenaris Connections Limited, Kingston (VC)

(72) Inventors: Gonzalo R. Gomez, Buenos Aires (AR); Claudio R. Morales, Buenos Aires (AR); Guillermo P. Echaniz, Buenos Aires (AR); Gustavo G. Kissner, Buenos Aires (AR)

(73) Assignee: TENARIS CONNECTIONS LIMITED, Kingstown, Saint Vincent (VC)

( * ) Notice: Subject to any disclaimer, the term of this patent is extended or adjusted under 35 U.S.C. 154(b) by 459 days.

(21) Appl. No.: 13/794,230

(22) Filed: Mar. 11, 2013

(65) Prior Publication Data

US 2014/0251512 A1    Sep. 11, 2014

(51) Int. Cl.
| | |
|---|---|
| C22C 38/32 | (2006.01) |
| C22C 38/20 | (2006.01) |
| C22C 38/22 | (2006.01) |
| C22C 38/24 | (2006.01) |
| C22C 38/28 | (2006.01) |
| C22C 38/26 | (2006.01) |
| C21D 9/08 | (2006.01) |
| C22C 38/04 | (2006.01) |
| C22C 38/02 | (2006.01) |

(52) U.S. Cl.
CPC ............... *C22C 38/32* (2013.01); *C21D 9/085* (2013.01); *C22C 38/02* (2013.01); *C22C 38/04* (2013.01); *C22C 38/20* (2013.01); *C22C 38/22* (2013.01); *C22C 38/24* (2013.01); *C22C 38/26* (2013.01); *C22C 38/28* (2013.01)

(58) Field of Classification Search
None
See application file for complete search history.

(56) References Cited

U.S. PATENT DOCUMENTS

| | | | |
|---|---|---|---|
| 3,413,166 | A | 11/1968 | Zackay et al. |
| 3,655,465 | A | 4/1972 | Snape et al. |
| 3,810,793 | A | 5/1974 | Heller |

(Continued)

FOREIGN PATENT DOCUMENTS

| | | |
|---|---|---|
| AR | 0050159 A1 | 10/2006 |
| CN | 1401809 | 3/2003 |

(Continued)

OTHER PUBLICATIONS

"Seamless Steel Tubes for Pressure Purposes—Technical Delivery Conditions—Part 1: Non.-alloy Steel Tubes with Specified Room Temperature Properties" British Standard BS EN 10216-1:2002 E:1-26, published May 2002.

(Continued)

*Primary Examiner* — Deborah Yee
(74) *Attorney, Agent, or Firm* — Knobbe Martens Olson and Bear LLP

(57) ABSTRACT

Embodiments of the present disclosure are direct to a low-carbon chromium steel, and methods for manufacturing said steel, having a low vanadium concentration. In some embodiments, the steel can have high corrosion resistance while retaining adequate strength and toughness. The steel can be manufactured through an austenitization process, followed by quenching at a controlled cooling rate, and tempering to form about 5 to 10% bainite, while limiting formation of chromium rich carbides.

19 Claims, 12 Drawing Sheets

(56) References Cited

U.S. PATENT DOCUMENTS

| | | |
|---|---|---|
| 3,915,697 A | 10/1975 | Giuliani et al. |
| 4,231,555 A | 11/1980 | Saito |
| 4,336,081 A | 6/1982 | Hijikata et al. |
| 4,376,528 A | 3/1983 | Ohshimatani et al. |
| 4,379,482 A | 4/1983 | Suzuki et al. |
| 4,407,681 A | 10/1983 | Ina et al. |
| 4,526,628 A | 7/1985 | Ohno et al. |
| 4,721,536 A | 1/1988 | Koch et al. |
| 4,812,182 A | 3/1989 | Fang et al. |
| 4,814,141 A | 3/1989 | Imai et al. |
| 5,352,406 A | 10/1994 | Barteri et al. |
| 5,454,883 A | 10/1995 | Yoshie et al. |
| 5,538,566 A | 7/1996 | Gallagher |
| 5,592,988 A | 1/1997 | Meroni et al. |
| 5,598,735 A | 2/1997 | Saito et al. |
| 5,879,474 A | 3/1999 | Bhadeshia et al. |
| 5,944,921 A | 8/1999 | Cumino et al. |
| 5,993,570 A | 11/1999 | Gray |
| 6,030,470 A | 2/2000 | Hensger et al. |
| 6,188,037 B1 | 2/2001 | Hamada et al. |
| 6,196,530 B1 | 3/2001 | Muhr et al. |
| 6,217,676 B1 | 4/2001 | Takabe et al. |
| 6,248,187 B1 | 6/2001 | Asahi et al. |
| 6,267,828 B1 | 7/2001 | Kushida et al. |
| 6,311,965 B1 | 11/2001 | Muhr et al. |
| 6,384,388 B1 | 5/2002 | Anderson et al. |
| 6,514,359 B2 | 2/2003 | Kawano |
| 6,632,296 B2 | 10/2003 | Yoshinaga et al. |
| 6,648,991 B2 | 11/2003 | Turconi et al. |
| 6,669,285 B1 | 12/2003 | Park et al. |
| 6,669,789 B1 | 12/2003 | Edelman et al. |
| 6,682,610 B1 | 1/2004 | Inoue |
| 6,683,834 B2 | 1/2004 | Ohara et al. |
| 6,709,534 B2 | 3/2004 | Kusinski et al. |
| 6,767,417 B2 | 7/2004 | Fujita et al. |
| 6,958,099 B2 | 10/2005 | Nakamura et al. |
| 7,074,283 B2 | 7/2006 | Omura |
| 7,083,686 B2 | 8/2006 | Itou |
| 7,118,637 B2 | 10/2006 | Kusinski et al. |
| 7,214,278 B2 | 5/2007 | Kusinski et al. |
| 7,264,684 B2 | 9/2007 | Numata et al. |
| 7,635,406 B2 | 12/2009 | Numata et al. |
| 7,744,708 B2 | 6/2010 | López et al. |
| 7,862,667 B2 | 1/2011 | Turconi et al. |
| 8,002,910 B2 | 8/2011 | Tivelli et al. |
| 8,007,601 B2 | 8/2011 | López et al. |
| 8,007,603 B2 | 8/2011 | Garcia et al. |
| 8,016,362 B2 | 9/2011 | Itoga |
| 2001/0035235 A1 | 11/2001 | Kawano |
| 2002/0011284 A1 | 1/2002 | Von Hagen et al. |
| 2003/0019549 A1 | 1/2003 | Turconi et al. |
| 2003/0111146 A1 | 6/2003 | Kusinski et al. |
| 2003/0116238 A1 | 6/2003 | Fujita |
| 2003/0155052 A1 | 8/2003 | Kondo et al. |
| 2003/0165098 A1 | 9/2003 | Ohara et al. |
| 2004/0118490 A1 | 6/2004 | Klueh et al. |
| 2004/0131876 A1 | 7/2004 | Ohgami et al. |
| 2004/0139780 A1 | 7/2004 | Cai et al. |
| 2005/0076975 A1 | 4/2005 | Lopez et al. |
| 2005/0087269 A1 | 4/2005 | Merwin |
| 2006/0124211 A1 | 6/2006 | Takano et al. |
| 2006/0137781 A1 | 6/2006 | Kusinski et al. |
| 2006/0169368 A1 | 8/2006 | Lopez et al. |
| 2006/0243355 A1 | 11/2006 | Haiderer et al. |
| 2007/0089813 A1 | 4/2007 | Tivelli |
| 2007/0137736 A1 | 6/2007 | Omura et al. |
| 2007/0216126 A1 | 9/2007 | Lopez et al. |
| 2008/0047635 A1 | 2/2008 | Konda et al. |
| 2008/0129044 A1 | 6/2008 | Carcagno et al. |
| 2008/0219878 A1 | 9/2008 | Konda et al. |
| 2008/0226396 A1 | 9/2008 | Garcia et al. |
| 2008/0314481 A1 | 12/2008 | Garcia et al. |
| 2009/0010794 A1 | 1/2009 | Lopez et al. |
| 2009/0101242 A1 | 4/2009 | Lopez et al. |
| 2010/0068549 A1 | 3/2010 | Agazzi |
| 2010/0136363 A1 | 6/2010 | Valdez et al. |
| 2010/0193085 A1 | 8/2010 | Garcia |
| 2010/0294401 A1 | 11/2010 | Gomez |
| 2010/0319814 A1 | 12/2010 | Perez |
| 2010/0327550 A1 | 12/2010 | Lopez |
| 2011/0097235 A1 | 4/2011 | Turconi et al. |
| 2011/0247733 A1 | 10/2011 | Arai et al. |

FOREIGN PATENT DOCUMENTS

| | | |
|---|---|---|
| CN | 1487112 | 4/2004 |
| CN | 101613829 A | 12/2009 |
| CN | 101413089 | 11/2010 |
| EP | 0 092 815 | 11/1983 |
| EP | 0 658 632 | 6/1995 |
| EP | 0 753 595 | 1/1997 |
| EP | 0 828 007 A | 3/1998 |
| EP | 0 989 196 | 3/2000 |
| EP | 01027944 B1 | 8/2000 |
| EP | 1 277 848 | 1/2003 |
| EP | 1 288 316 | 3/2003 |
| EP | 1 413 639 | 4/2004 |
| EP | 1 717 324 | 11/2006 |
| EP | 1 914 324 | 4/2008 |
| EP | 2 028 284 | 2/2009 |
| EP | 2 133 442 | 12/2009 |
| JP | 60-086209 | 5/1985 |
| JP | 60-215719 | 10/1985 |
| JP | 36025719 | 10/1985 |
| JP | 61270355 | 11/1986 |
| JP | 63004046 A2 | 1/1988 |
| JP | 63004047 A2 | 1/1988 |
| JP | 63230847 A2 | 9/1988 |
| JP | 63230851 A2 | 9/1988 |
| JP | 01 259124 A2 | 10/1989 |
| JP | 01 259125 A2 | 10/1989 |
| JP | 01 283322 A2 | 11/1989 |
| JP | 05-098350 | 12/1990 |
| JP | 403006329 A | 1/1991 |
| JP | 04 021718 A2 | 1/1992 |
| JP | 04 107214 | 4/1992 |
| JP | 04 231414 A2 | 8/1992 |
| JP | 05 287381 A2 | 11/1993 |
| JP | 06-093339 | 4/1994 |
| JP | 06 172859 A2 | 6/1994 |
| JP | 06-220536 | 8/1994 |
| JP | 07 041856 A2 | 2/1995 |
| JP | 07 197125 A2 | 8/1995 |
| JP | 08 311551 | 11/1996 |
| JP | 09 067624 A2 | 3/1997 |
| JP | 09-235617 | 9/1997 |
| JP | 10 140250 | 5/1998 |
| JP | 10176239 | 6/1998 |
| JP | 10 280037 A | 10/1998 |
| JP | 11 050148 A | 2/1999 |
| JP | 11140580 | 5/1999 |
| JP | 11229079 | 8/1999 |
| JP | 2000-063940 | 2/2000 |
| JP | 2000-313919 A2 | 11/2000 |
| JP | 2001-131698 | 5/2001 |
| JP | 2001-164338 | 6/2001 |
| JP | 2001-172739 A2 | 6/2001 |
| JP | 2001-271134 | 10/2001 |
| JP | 2002-096105 A2 | 4/2002 |
| JP | 2004-011009 | 1/2004 |
| JP | 60 174822 | 9/2005 |
| KR | 0245031 | 3/2000 |
| WO | WO 96/22396 | 7/1996 |
| WO | WO 00/70107 | 11/2000 |
| WO | WO 01/88210 | 11/2001 |
| WO | WO 03/033856 | 4/2003 |
| WO | WO 2004/031420 | 4/2004 |
| WO | WO 2004/097059 A1 | 11/2004 |
| WO | WO 2007/017161 | 2/2007 |
| WO | WO 2008/003000 | 1/2008 |
| WO | WO 2008/127084 A2 | 10/2008 |
| WO | WO 2009/044297 | 4/2009 |
| WO | WO 2010/061882 | 6/2010 |

OTHER PUBLICATIONS

(56) References Cited

OTHER PUBLICATIONS

"Seamless Steel Tubes for Pressure Purposes—Technical Delivery Conditions—Part 2: Non-alloy and Alloy Steel Tubes with Specified Elevated Temperature Properties" British Standard BS EN 10216-2:2002+A2:2007:E:1-45, published Aug. 2007.

"Seamless Steel Tubes for Pressure Purposes—Technical Delivery Conditions—Part 3: Alloy Fine Grain Steel Tubes" British Standard BS EN 10216-3:2002 +A1:2004 E:1-34, published Mar. 2004.

"Seamless Steel Tubes for Pressure Purposes—Technical Delivery Conditions—Part 4: Non-alloy and Alloy Steel Tubes with Specified Low Temperature Properties" British Standard BS EN 10216-4:2002 + A1:2004 E:1-30, published Mar. 2004.

Aggarwal, R. K., et al.: "Qualification of Solutions for Improving Fatigue Life at SCR Touch Down Zone", Deep Offshore Technology Conference, Nov. 8-10, 2005, Vitoria, Espirito Santo, Brazil, in 12 pages.

Anelli, E., D. Colleluori, M. Pontremoli, G. Cumino, A. Izquierdo, H. Quintanilla, "Metallurgical design of advanced heavy wall seamless pipes for deep-water applications", 4th International Conference on Pipeline Technology, May 9 to 13, 2004, Ostend, Belgium.

Asahi, et al., Development of Ultra-high-strength Linepipe, X120, Nippon Steel Technical Report, Jul. 2004, Issue 90, pp. 82-87.

ASM Handbook, Mechanical Tubing and Cold Finishing, Metals Handbook Desk Edition, (2000), 5 pages.

Bai, M., D. Liu, Y. Lou, X. Mao, L. Li, X. Huo, "Effects of Ti addition on low carbon hot strips produced by CSP process", Journal of University of Science and Technology Beijing, 2006, vol. 13, N° 3, p. 230.

Beretta, Stefano et al., "Fatigue Assessment of Tubular Automotive Components in Presence of Inhomogeneities", Proceedings of IMECE2004, ASME International Mechanical Engineering Congress, Nov. 13-19, 2004, pp. 1-8.

Berner, Robert A., "Tetragonal Iron Sulfide", Science, Aug. 31, 1962, vol. 137, Issue 3531, pp. 669.

Berstein et al.,"The Role of Traps in the Microstructural Control of Hydrogen Embrittlement of Steels" Hydrogen Degradation of Ferrous Alloys, Ed. T. Oriani, J. Hirth, and M. Smialowski, Noyes Publications, 1988, pp. 641-685.

Boulegue, Jacques, "Equilibria in a sulfide rich water from Enghien-les-Bains, France", Geochimica et Cosmochimica Acta, Pergamom Press, 1977, vol. 41, pp. 1751-1758, Great Britain.

Bruzzoni et al., "Study of Hydrogen Permeation Through Passive Films on Iron Using Electrochemical Impedance Spectroscopy", PhD Thesis, 2003, Universidad Nacional del Comahue de Buenos Aires, Argentina.

Cancio et al., "Characterization of microalloy precipitates in the austenitic range of high strength low alloy steels", Steel Research, 2002, vol. 73, pp. 340-346.

Carboni, A., A. Pigani, G. Megahed, S. Paul, "Casting and rolling of API X 70 grades for artic application in a thin slab rolling plant", Stahl u Eisen, 2008, N° 1, p. 131-134.

Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.

Clark, A. Horrell, "Some Comments on the Composition and Stability Relations of Mackinawite", Neues Jahrbuch fur Mineralogie, 1966, vol. 5, pp. 300-304, London, England.

Craig, Bruce D., "Effect of Copper on the Protectiveness of Iron Sulfide Films", Corrosion, National Association of Corrosion Engineers, 1984, vol. 40, Issue 9, pp. 471-474.

D.O.T. 178.68 Spec. 39, pp. 831-840, Non reusable (non refillable) cylinders, Oct. 1, 2002.

De Medicis, Rinaldo, "Cubic FeS, A Metastable Iron Sulfide", Science, American Association for the Advancement of Science, Steenbock Memorial Library, Dec. 11, 1970, vol. 170, Issue 3963, pp. 723-728.

Echaniz, G., Morales, C., Perez, T., "Advances in Corrosion Control and Materials in Oil and Gas Production" Papers from Eurocorr 97 and Eurocorr 98, 13, P. S. Jackman and L.M. Smith, Published for the European Federation of Corrosion, No. 26, European Federation of Corrosion Publications, 1999.

Fang, Hong-Sheng, et al.: "The Developing Prospect of Air-cooled Baintitic Steels", International Journal of Issi, vol. 2, No. 2, Feb. 1, 2005, pp. 9-18.

Gojic, Mirko and Kosec, Ladislav, "The Susceptibility to the Hydrogen Embrittlement of Low Alloy Cr and CrMo Steels", ISIJ International, 1997, vol. 37, Issue 4, pp. 412-418.

Heckmann, et al., Development of low carbon Nb—Ti—B microalloyed steels for high strength large diameter linepipe, Ironmaking and Steelmaking, 2005, vol. 32, Issue 4, pp. 337-341.

Howells, et al.: "Challenges for Ultra-Deep Water Riser Systems", IIR, London, Apr. 1997, 11 pages.

Hutchings et al., "Ratio of Specimen thickness to charging area for reliable hydrogen permeation measurement", British Corrosion. Journal, 1993, vol. 28, Issue 4, pp. 309-312.

Iino et al., "Aciers pour pipe-lines resistant au cloquage et au criquage dus a l'hydrogene", Revue de Metallurgie, 1979, vol. 76, Issue 8-9, pp. 591-609.

Ikeda et al., "Influence of Environmental Conditions and Metallurgical Factors on Hydrogen Induced Cracking of Line Pipe Steel", Corrosion/80, National Association of Corrosion Engineers, 1980, vol. 8, pp. 8/1-8/18, Houston, Texas.

Izquierdo, et al.: "Qualification of Weldable X65 Grade Riser Sections with Upset Ends to Improve Fatigue Performance of Deepwater Steel Catenary Risers", Proceedings of the Eighteenth International Offshore and Polar Engineering Conference, Vancouver, BC, Canada, Jul. 6-11, 2008, p. 71.

Johnston, P. W., G.Brooks, "Effect of Al2O3 and TiO2 Additions on the Lubrication Characteristics of Mould Fluxes", Molten Slags, Fluxes and Salts '97 Conference, 1997 pp. 845-850.

Keizer, Joel, "Statistical Thermodynamics of Nonequilibrium Processes", Spinger-Verlag, 1987.

Kishi, T., H.Takeucgi, M.Yamamiya, H.Tsuboi, T.Nakano, T.Ando, "Mold Powder Technology for Continuous Casting of Ti-Stabilized Stainless Steels", Nippon Steel Technical Report, No. 34, Jul. 1987, pp. 11-19.

Korolev, D. F., "The Role of Iron Sulfides in the Accumulation of Molybdenum in Sedimentary Rocks of the Reduced Zone", Geochemistry, 1958, vol. 4, pp. 452-463.

Lee, Sung Man and Lee, Jai Young, "The Effect of the Interface Character of TiC Particles on Hydrogen Trapping in Steel", Acta Metall., 1987, vol. 35, Issue 11, pp. 2695-2700.

Mishael, et al., "Practical Applications of Hydrogen Permeation Monitoring," Corrosion, Mar. 28-Apr. 1, 2004, Corrosion 2004, Nacional Association of Corrosion Engineers, vol. Reprint No. 04476.

Morice et al., "Moessbauer Studies of Iron Sulphides", J. Inorg. Nucl. Chem., 1969, vol. 31, pp. 3797-3802.

Mukongo, T., P.C.Pistorius, and A.M.Garbers-Craig, "Viscosity Effect of Titanium Pickup by Mould Fluxes for Stainless Steel", Ironmaking and Steelmaking, 2004, vol. 31, No. 2, pp. 135-143.

Mullet et al., "Surface Chemistry and Structural Properties of Mackinawite Prepared by Reaction of Sulfide Ions with Metallic Iron", Geochemica et Cosmochemica Acta, 2002, vol. 66, Issue 5, pp. 829-836.

Murcowchick, James B. and Barnes, H.L., "Formation of a cubic FeS", American Mineralogist, 1986, vol. 71, pp. 1243-1246.

Nagata, M., J. Speer, D. Matlock, "Titanium nitride precipitation behavior in thin slab cast high strength low alloyed steels", Metallurgical and Materials Transactions A, 2002 ,vol. 33A, p. 3099-3110.

Nakai et al., "Development of Steels Resistant to Hydrogen Induced Cracking in Wet Hydrogen Sulfide Environment", Transactions of the ISIJ, 1979, vol. 19, pp. 401-410.

Pressure Equipment Directive 97/23/EC, May 29, 1997, downloaded from website:http://ec.europa.eu/enterprise/pressure_equipment/ped/index_en.html on Aug. 4, 2010.

Prevéy, Paul, et al., "Introduction of Residual Stresses to Enhance Fatigue Performance in the Initial Design", Proceedings of Turbo Expo 2004, Jun. 14-17, 2004, pp. 1-9.

Rickard, D.T., "The Chemistry of Iron Sulphide Formation at Low Tempuratures", Stockholm Contrib. Geol., 1969, vol. 26, pp. 67-95.

(56) References Cited

OTHER PUBLICATIONS

Riecke, Ernst and Bohnenkamp, Konrad, "Uber den Einfluss von Gittersoerstellen in Eisen auf die Wassersroffdiffusion", Z. Metallkde . . . , 1984, vol. 75, pp. 76-81.
Shanabarger, M.R. and Moorhead, R. Dale, "H2O Adsorption onto clean oxygen covered iron films", Surface Science, 1996, vol. 365, pp. 614-624.
Shoesmith, et al., "Formation of Ferrous Monosulfide Polymorphs During Corrosion of Iron by Aqueous Hydrogen Sulfide at 21 degrees C", Journal of the Electrochemical Society, 1980, vol. 127, Issue 5, pp. 1007-1015.
Skoczylas, G., A.Dasgupta, R.Bommaraju, "Characterization of the chemical interactions during casting of High-titanium low carbon enameling steels", 1991 Steelmaking Conference Proceeding, pp. 707-717.
Smyth, D., et al.: Steel Tublar Products, Properties and Selection: Irons, Steels, and High-Performance Alloys, vol. 1, ASM Handbook, ASM International, 1990, p. 327-336.
Spry, Alan, "Metamorphic Textures", Perganom Press, 1969, New York.
Taira et al., "HIC and SSC Resistance of Line Pipes for Sour Gas Service, Nippon Kokan Technical Report", 1981, vol. 31, Issue 1-13.
Taira et al., "Study on the Evaluation of Environmental Condition of Wet Sour Gas", Corrosion 83 (Reprint. No. 156, National Association of Corrosion Engineers), 1983, pp. 156/2-156/13, Houston, Texas.
Takeno et al., "Metastable Cubic Iron Sulfide—With Special Reference to Mackinawite", American Mineralogist, 1970, vol. 55, pp. 1639-1649.
Tenaris Newsletter for Pipeline Services, Apr. 2005, p. 1-8.
Tenaris Newsletter for Pipeline Services, May 2003, p. 1-8.
Thethi, et al.: "Alternative Construction for High Pressure High Temperature Steel Catenary Risers", OPT USA, Sep. 2003, p. 1-13.
Thewlis, G., Weldability of X100 linepipe, Science and Technology of Welding and Joining, 2000, vol. 5, Issue 6, pp. 365-377.
Tivelli, M., G. Cumino, A. Izquierdo, E. Anelli, A. Di Schino, "Metallurgical Aspects of Heavy Wall—High Strength Seamless Pipes for Deep Water Applications", RioPipeline 2005, Oct. 17 to 19, 2005, Rio (Brasil), Paper n° IBP 1008_05.
Todoroki, T. Ishii, K. Mizuno, A. Hongo, "Effect of crystallization behavior of mold flux on slab surface quality of a Ti-bearing Fe—Cr—Ni super alloy cast by means of continuous casting process", Materials Science and Engineering A, 2005, vol. 413-414, p. 121-128.
Turconi, G. L.: "Improvement of resistance to SSC initiation and propagation of high strength OCTG through microstruture and precipitation control"; "Paper 01077", NACE International, Houston, TX, Mar. 16, 2001. (XP009141583).
Vaughan, D. J. and Ridout, M.S., "Moessbauer Studies of Some Sulphide Minerals", J. Inorg Nucl. Chem., 1971, vol. 33, pp. 741-746.
Wegst, C.W., "Stahlússel", Auflage 1989, Seite 119, 2 pages.

LOW-CARBON CHROMIUM STEEL HAVING REDUCED VANADIUM AND HIGH CORROSION RESISTANCE, AND METHODS OF MANUFACTURING

BACKGROUND

1. Field

Embodiments of the present disclosure relate to the composition and manufacturing of low carbon steel tubes with high corrosion resistance.

2. Description of the Related Art

Corrosion has a wide range of implications on the integrity of materials used in the oil industry. Among the different ways in which corrosion may appear there is the so-called "sweet corrosion" that occurs in media rich in $CO_2$. This is one of the prevailing ways of corrosion that must be faced when producing oil and gas.

The damage produced by corrosion caused by $CO_2$ has an impact on capital and operational investment, as well as on health, security, and environmental impact. Many of the failures occurring in the oil wells are the result of the corrosion caused by $CO_2$.

Steels having a high resistance to corrosion have been developed to manufacture pipes for oil and/or gas exploration and production in the petroleum industry. For example, low-carbon steels having an improved resistance to corrosion have been developed for applications in the oil industry and particularly in environments containing $CO_2$. Nevertheless, further improvements in the manufacturing, corrosion resistance, cost of raw materials and other properties of such steels are still desired.

SUMMARY

Embodiments of the present disclosure are directed to steel tubes or pipes and methods of manufacturing the same.

In some embodiments, a seamless steel pipe can comprise a composition comprising 0.06-0.10 wt. % carbon, 1.5-4.5 wt. % chromium, 0.3-0.8 wt. % manganese, 0.20-0.35 wt. % silicon, 0 to 0.55 wt. % molybdenum, 0 to 0.06 wt. % vanadium, 0 to 0.3 wt. % copper, 0.01-0.03 wt. % titanium, 0.0001 to 0.0025 wt. % boron, 0 to 0.08 wt. % niobium, and the remainder being iron and inevitable impurities. The final microstructure of the pipe can comprise a mixture of tempered martensite and upper bainite, where the final microstructure of the pipe comprises at least 5 volume % bainite. The seamless steel tube can have approximately 85 wt. % or more of chromium kept in solid solution, and substantially all of any retained austenite is decomposed. In some embodiments, the final microstructure of the pipe can comprise at least 30 volume % bainite or at least 40 volume % bainite. In some embodiments, the stainless steel pipe can comprise less than 0.005 wt. % sulfur and less than 0.018 wt. % phosphorus.

In some embodiments, the upper bainite can comprise ferrite laths having a thickness of approximately 300 nm or less. The ferrite laths can also be approximately 200 nm or less.

In some embodiments, the pipe can have approximately one half to one third of the $CO_2$ corrosion resistance of a conventional carbon steel in a mild $CO_2$ aqueous environment. The pipe can have no failures in a Method A NACE TM 177 test, in Region 1 of ISO 15156 part 2. In some embodiments, the pipe as quenched can have a hardness of approximately 370 HV1. In some embodiments, the pipe can have a corrosion rate of approximately 0.2 mm/year in a 200 gr/lt NaCl, 25 mg/lt $NaHCO_3$ environment at a temperature of about 60° C.

In some embodiments, the pipe can have a yield strength greater than about 80 ksi, an ultimate tensile strength greater than about 98 ksi, an elongation greater than about 15.5%; and a minimum absorbed energy in Charpy V-notch impact test of 27 J at 0° C.

In some embodiments, the pipe composition can further comprise 3.0-4.0 wt. % chromium, 0.4-0.65 wt. % manganese, less than 0.004 wt. % sulfur, 0.25-0.35 wt. % silicon, 0.02-0.06 wt. % vanadium, 0.01-0.25 wt. % titanium, 0.0005 to 0.0020 wt. % boron, and 0 to 0.04 wt. % niobium.

In some embodiments, a method of manufacturing a seamless steel pipe can comprise providing a steel composition comprising, 0.06-0.10 wt. % carbon, 1.5-4.5 wt. % chromium, 0.3-0.8 wt. % manganese, 0.20-0.35 wt. % silicon, 0 to 0.55 wt. % molybdenum, 0 to 0.06 wt. % vanadium, 0 to 0.3 wt. % copper, 0.01-0.03 wt. % titanium, 0.0001 to 0.0025 wt. % boron, 0 to 0.08 wt. % niobium, and the remainder being iron and inevitable impurities. The method can further comprise austenitizing the steel composition at a temperature high enough to dissolve substantially all iron and chromium rich carbides and low enough to obtain an austenitic grain size prior to quenching of 20 μm or less, quenching the steel composition at a rate to produce a microstructure comprising a mixture of martensite and fine upper bainite comprising alternating ferrite plates and elongated iron carbides, and at a rate where austenite composition is proceeding below 550° C., and tempering the steel composition to form tempered martensite and upper bainite using low temperature and soaking time in order to keep approximately 85 wt. % of the chromium in solid solution. In some embodiments, the final microstructure of the pipe can comprise at least 5 volume % bainite where substantially all of any retained austenite is decomposed. In some embodiments, the steel composition can comprise less than 0.005 wt. % sulfur and less than 0.018 wt. % phosphorus.

In some embodiments, the austenitic grain size prior to quenching is approximately 15 μm or less. In some embodiments, the steel is quenched at a rate greater than about 10° C./sec. In some embodiments, the final microstructure can comprise at least 30 or 40 volume % bainite.

In some embodiments, steel composition further can further comprise 3.0-4.0 wt. % chromium, 0.4-0.65 wt. % manganese, less than 0.004 wt. % sulfur, 0.25-0.35 wt. % silicon, 0.02-0.06 wt. % vanadium, 0.01-0.25 wt. % titanium, 0.0005 to 0.0020 wt. % boron, and 0 to 0.04 wt. % niobium.

DETAILED DESCRIPTION

Figure 1:
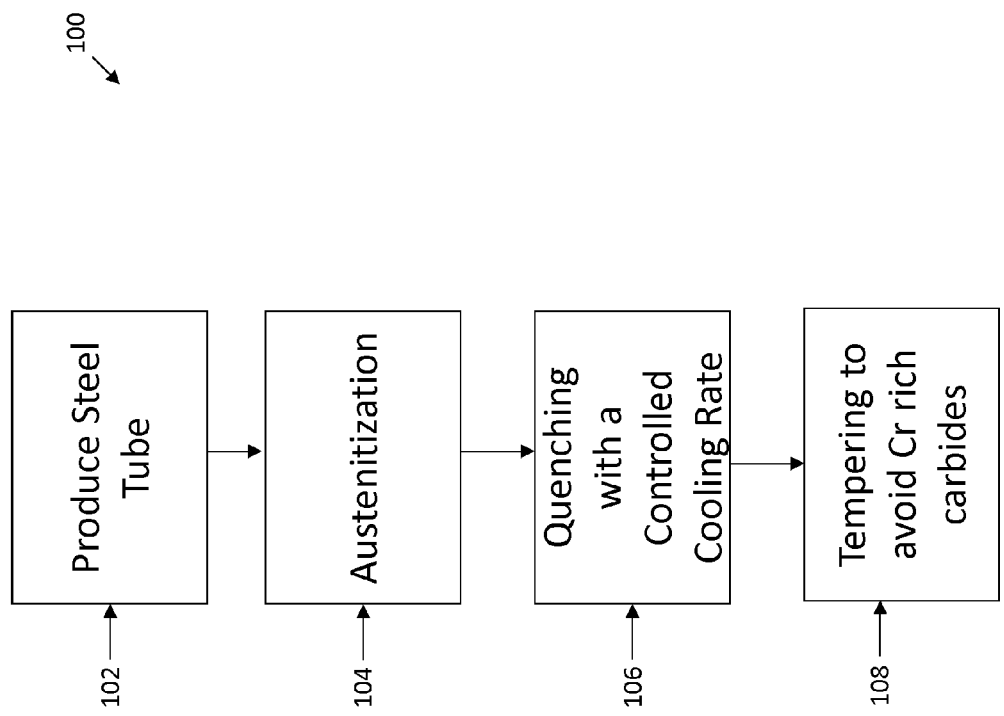
FIG. 1 illustrates the methods of manufacturing a steel with high corrosion resistance in accordance with one embodiment.

Embodiments of the present disclosure provide tubes (e.g., pipes, tubular rods and tubular bars) having a determinate steel composition, and methods of manufacturing them. In particular, the steel tubes can be seamless or welded tubes used for the exploration and production of oil and/or natural gas and having improved resistance to corrosion. However, the steel tubes described herein can be used in other applications as well.

The term "tube" as used herein is a broad term and includes its ordinary dictionary meaning and also refers to a generally hollow, straight, elongate member which may be formed to a predetermined shape, and any additional forming required to secure the formed tube in its intended location. The tube may have a substantially circular outer surface and inner surface, although other shapes and cross-sections are contemplated as well.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

The term "up to about" as used herein has its ordinary meaning as known to those skilled in the art and may include 0 wt. %, minimum or trace wt. %, the given wt. %, and all wt. % in between.

In general, embodiments of the present disclosure comprise carbon steels and methods of manufacturing the same. As discussed in greater detail below, through a combination of steel composition and processing steps, a final microstructure and in-solution chemical composition may be achieved that gives rise to selected mechanical properties of interest, including at least increased corrosion resistance, while maintaining adequate yield strength and toughness. For example, the tube may have increased levels of chromium in solution to form a steel tube with desired properties and microstructure.

The steel composition of certain embodiments of the present disclosure comprises a steel alloy comprising carbon (C) and other alloying elements such as manganese (Mn), silicon (Si), chromium (Cr), boron (B), and titanium (Ti). Additionally, one or more of the following elements may be optionally present and/or added as well: vanadium (V), molybdenum (Mo), niobium (Nb) and Copper (Cu). The remainder of the composition comprises iron (Fe) and impurities. In certain embodiments, the concentration of impurities may be reduced to as low an amount as possible. Embodiments of impurities may include, but are not limited to, sulfur (S) and phosphorous (P). Residuals of lead (Pb), tin (Sn), antimony (Sb), arsenic (As), and bismuth (Bi) may be found in a combined maximum of 0.05 wt. %.

Elements within embodiments of the steel composition may be provided as below in Table I, where the concentrations are in wt. % unless otherwise noted. Embodiments of steel compositions may include a subset of elements of those listed in Table I. For example, one or more elements listed in Table I may not be required to be in the steel composition. Furthermore, some embodiments of steel compositions may consist of or consist essentially of the elements listed in Table I or may consist of or consist essentially of a subset of elements listed in Table I. For compositions provided throughout this specification, it will be appreciated that the compositions may have the exact values or ranges disclosed, or the compositions may be approximately, or about that of, the values or ranges provided.

TABLE I

Steel composition range (wt. %) after steelmaking operations.

| Element | Composition Range | | | |
|---|---|---|---|---|
| | Broader Example | | Narrower Example | |
| (wt. %) | Minimum | Maximum | Minimum | Maximum |
| C | 0.06 | 0.10 | 0.06 | 0.10 |
| Cr | 1.5 | 4.5 | 3.0 | 4.0 |
| Mn | 0.3 | 0.8 | 0.40 | 0.65 |
| S | — | 0.005 | — | 0.004 |
| P | — | 0.018 | — | 0.018 |
| Si | 0.20 | 0.35 | 0.25 | 0.35 |
| Mo | — | 0.55 | — | 0.55 |
| V | — | 0.06 | 0.02 | 0.06 |
| Cu | — | 0.3 | — | 0.3 |
| Ti | 0.01 | 0.03 | 0.01 | 0.025 |
| B | 0.0001 | 0.0025 | 0.0005 | 0.0025 |
| Nb | — | 0.08 | — | 0.04 |

C is an element whose addition inexpensively raises the strength of the steel. If the C content is less than about 0.06 wt. %, it may be in some embodiments difficult to obtain the strength desired in the steel. On the other hand, in some embodiments, if the steel composition has a C content greater than about 0.10 wt. %, toughness may be impaired. Additionally, higher C contents may also increase Cr-rich carbide precipitation, which reduces Cr in solid solution and impairs corrosion resistance. An exemplifying C content range is preferably about 0.06 to about 0.10 wt. %.

Cr is an element whose addition can increase corrosion resistance of a steel, specifically by having Cr in solid solution in the ferrite matrix of the microstructure of the steel. Therefore, to allow for high corrosion resistant steel, it is preferable to avoid, as much as possible, Cr precipitation in the form of carbides such as, for example, $M_7C_3$ or $M_{23}C_6$. Additionally, Cr increases hardenability and tempering resistance of the steel. Therefore, it is desirable for achieving high strength levels. In an embodiment, if the Cr content of the steel composition is less than about 1.5 wt. %, it may be difficult to obtain the desired strength and corrosion resistance. In other embodiments, if the Cr content of the steel composition exceeds about 4.5 wt. %, toughness may decrease. Therefore, in certain embodiments, the Cr content of the steel composition may vary within the range between about 1.5 to about 4.5 wt. %, preferably about 3.0 to about 4.0 wt. %.

Mn is an element whose addition is effective in increasing the hardenability of the steel, strength and toughness of the steel. If the Mn content is too low it may be difficult in some embodiments to obtain the desired strength in the steel. However, if the Mn content is too high, in some embodiments banding structures become marked and toughness decreases.

Accordingly, an exemplifying Mn content range is about 0.3 to about 0.8 wt. %, preferably about 0.4 to about 0.65 wt. %.

S is an element that causes the toughness of the steel to decrease. Accordingly, an exemplifying S content of the steel in some embodiments is limited up to about 0.005 wt. %, preferably limited up to about 0.004 wt. %.

P is an element that causes the toughness of the steel to decrease. Accordingly, an exemplifying P content of the steel in some embodiments is limited up to about 0.018 wt. %.

Si is an element whose addition has a deoxidizing effect during steel making process and also raises the strength of the steel. If the Si content is too low, the steel in some embodiments may be susceptible to oxidation, with a high level of micro-inclusions. On the other hand, though, if the Si content of the steel is too high, in some embodiments both toughness and formability of the steel decrease. Therefore, an exemplifying Si content range is about 0.20 to about 0.35 wt. %, preferably about 0.25 to about 0.35 wt. %.

Mo is an element whose addition is effective in increasing the strength of the steel and further assists in improving hardenability and retarding softening during tempering. Mo additions may also reduce the segregation of phosphorous to grain boundaries, improving resistance to inter-granular fracture. However, this ferroalloy is expensive, making it desirable to reduce the maximum Mo content within the steel composition. Therefore, in certain embodiments, Mo content within the steel composition may be limited up to about 0.55 wt. %.

V is an element whose addition may be used to increase the strength of the steel by carbide precipitation during tempering. However, increased levels of vanadium can cause cracking in steel during manufacturing, thus leading to reduced manufacturing efficiency and increased reprocessing as the damaged steel will have to be remanufactured. Therefore, in some embodiments the levels of vanadium have been decreased, which leads to increased manufacturing efficiency and decrease reprocessing. The reduced vanadium levels can lead to reduced defects, such as cracking, during the hot rolling process. Moreover, reducing vanadium levels can lead to a reduction of energy consumption, and the corresponding reduction of environmental damage, because $CO_2$ emission is limited in the associated combustion processes directly or indirectly related to the manufacturing process. The less need there is for manufacturing, the less energy is consumed. Therefore, in certain embodiments, the V content of the steel composition may be limited up to about 0.06 wt. %, more preferably within the range of about 0.02 to about 0.06 wt. %. As mentioned above, reducing the levels of vanadium, such as to below 0.06 wt. %, can reduce the waste produced and the energy consumed during the manufacturing of the steel.

Cu is an element that is not required in certain embodiments of the steel composition. However, depending upon the steel fabrication process, the presence of Cu may be unavoidable. Thus, in certain embodiments, the Cu content of the steel composition may be limited up to about 0.3 wt. %.

Ti is an element whose addition can refine austenitic grain size of the steel during hot rolling and increase the effectiveness of B in the steel. If the Ti content is too low it may be difficult in some embodiments to obtain the desired hardenability of the steel. However, in some embodiments, if the Ti content is too high, workability of the steel decreases. Accordingly, an exemplifying Ti content of the steel is within the range of about 0.01 to about 0.03 wt. %, preferably about 0.01 to about 0.025 wt. %.

B is an element whose addition is effective in increasing the hardenability of the steel. If the B content is too low, it may be difficult in some embodiments to obtain the desired hardenability of the steel. However, in some embodiments, if the B content is too high, toughness of the steel decreases. Accordingly, an exemplifying B content of the steel is within the range of about 0.0001 up to about 0.0025 wt. %, preferably within the range of about 0.0005 to about 0.0025 wt. %.

Nb is an element whose addition to the steel composition can refine the austenitic grain size of the steel during hot rolling, with the subsequent increase in both strength and toughness. Nb may also precipitate during tempering, increasing the steel strength by particle dispersion hardening. However, in some embodiments, if the Nb content is too high, workability and toughness of the steel decrease. Accordingly, an exemplifying Nb content of the steel is within the range of about 0% to about 0.080%, preferably about 0% to about 0.040%.

The contents of unavoidable impurities including, but not limited to, Pb, Sn, As, Sb, Bi and the like are preferably kept as low as possible. Furthermore, properties (e.g., strength, toughness) of steels formed from embodiments of the steel compositions of the present disclosure may not be substantially impaired provided these impurities are maintained below selected levels.

The above chemical composition can lead to improved properties for a steel in corrosive environments, such as environments classified as mild sweet environments (rich in $CO_2$), which may additionally contain, for example, hydrogen sulfide. Furthermore, the above composition can produce steels having a good SSC performance in Method A NACE TM 177 test, in Region 1 of ISO 15156 part 2, hereby incorporated by reference. Specifically, the controlled levels of nitrogen, boron, and titanium can create a steel with consistent SSC performance. Additionally, the above described chemical composition can lead to increased $CO_2$ corrosion resistance. The increased resistance to $CO_2$ can occur due to the high levels of Cr that can be maintained in solid solution.

Preferably, embodiments of steel manufactured from the above composition have a yield strength of at least about 80 Ksi (552 MPa) and a minimum absorbed energy in a Charpy V-notch impact test of 27 J at 0° C. (longitudinal direction, full size sample according to API 5CT, hereby incorporated by reference in its entirety.)

Manufacturing Process

In some embodiments, a seamless steel pipe can be produced using one or more heat treatments comprising austenitization, quenching, and tempering.

An embodiment of a method 100 of producing a steel tube is illustrated in FIG. 1. In operational block 102, a steel composition is provided and formed into a steel bar (e.g., rod) or slab (e.g., plate). In some embodiments, the steel composition is the steel composition discussed above with respect to Table I. Melting of the steel composition can be done in an Electric Arc Furnace (EAF), with an Eccentric Bottom Tapping (EBT) system. Aluminum de-oxidation practice can be used to produce fine grain fully killed steel. Liquid steel refining can be performed by control of the slag and argon gas bubbling in the ladle furnace. Ca—Si wire injection treatment can be performed for residual non-metallic inclusion shape control. The steel can then be formed into desired shapes, such a steel pipe further described below, although the shape of the steel is not limiting.

In some embodiments, as shown in operational block 104, the steel pipe can be processed through austenitization. Austenitization can be performed at a temperature high enough to dissolve all of the iron and chromium rich carbides which can be formed prior to this process, and low enough to obtain a specified austenitic grain size prior to quenching. For example, the steel can go through an austenitization temperature of about 850 to about 950° C. In some embodiments, after austenitization and prior to quenching, the grain size in the steel can be about 20 microns or lower, preferably about 15 microns or lower.

As shown in operational block 106, in some embodiments the steel composition can be quenched after austenitization at a controlled cooling rate to form a specific microstructure through austenite decomposition. In some embodiments, the steel is quenched at a cooling rate so that the austenite decomposes into a microstructure composed of a mixture of martensite and upper bainite. Further description of the quenching process is described below. In some embodiments, the proportion of bainite in the final structure can be greater than 5%, preferably greater than 10%. The combination of a specified cooling rate and steel chemistry can lead to austenite decomposing at temperatures lower than about 550° C., thereby forming bainite. In some embodiments, due to the low transformation temperature, a fine bainitic structure of alternating ferrite plates/laths and elongated iron carbides is formed within the steel, wherein the ferrite plates or laths have a thickness of less than about 300 nm, preferably less than about 200 nm. In some embodiments, there is no ferrite/pearlite structure. The iron carbides, which can be located in or around the bainite, can comprise cementite particles. Cementite carbides formed in bainite at low temperatures are an iron rich precipitate with relatively low chromium concentration, due to the low Cr diffusivity below 550° C. Therefore, the cementite particles do not encourage the dissolving of chromium into the particles, thereby chromium can be kept in solid solution. By having more chromium in solid solution, the steel can have improved corrosion resistance. In some embodiments, greater than about 85% chromium remains in solid solution.

As shown in operational block 108, in some embodiments the steel can be tempered after quenching. Tempering can increase the toughness of the steel by, for example, recovery and precipitation in the martensitic structure and decomposition of the retained austenite. In some embodiments, the tempering decomposes substantially all of the retained austenite. The tempering temperature can be kept at a generally low tempering temperature, thereby avoiding the precipitation of chromium rich carbides. Additionally, shorter soaking times during tempering can also reduce the precipitation of Cr rich carbides. For example, tempering can be done as high as 700° C. when using low soaking times. During tempering, the bainite is not strongly affected by the process, except for some minor precipitate coarsening.

The final microstructure of the above described compositions and methods can comprise tempered martensite and very fine bainite. In some embodiments, the carbon can be precipitated out as cemenitite, which, as described above, can contain a lower chromium content in comparison to Cr rich carbides, such as $M_7C_3$ and $M_{23}C_6$. Therefore, the steel can be processed and manufactured so that Cr can be maximized to be retained in solid solution. Additionally, the steel can be processed and manufactured so that no retained austenite may be present. This can be useful as block, or blocky, regions of this microstructure may transform into non-tempered martensite upon loading, which may impair overall toughness.

EXAMPLES

The following examples are provided to demonstrate the benefits of embodiments of steel tubes with a composition within the ranges of Table I and manufactured with respect to FIG. 1, as compared to other low carbon formulations. These examples are discussed for illustrative purposes and should not be construed to limit the scope of the disclosed embodiments.

Example 1

Table II shows the chemical composition of Steel A, which has a composition within the ranges of Table I and was manufactured with respect to FIG. 1. Steel A comprises a low carbon chromium steel, alloyed with Mn, Si, Mo and Cu and microalloyed with V—Ti—B. For comparison is presented Steel B, with chemistry within the ranges claimed in U.S. Pat. No. 6,648,991, hereby incorporated by reference in its entirety. One difference between the chemistries of Steel A and B is in Cr, Mo and V contents, which are lower in Steel A. Steel A is microalloyed with boron, which can control phase transformation during continuous cooling. The Mo and V reductions can further decrease alloy cost and improve productivity during hot rolling in comparison with Steel B. In order to achieve similar corrosion resistance as Steel B, processing conditions during thermal treatments of Steel A are carefully defined. The objective of thermal treatments on Steel A is to produce a final microstructure mainly composed of a mixture of fine upper bainite and martensite, in which almost all of the Chromium is kept in solid solution in ferrite.

TABLE II

Chemical compositions in weight percent of analyzed steels.

| Steel | C (wt %) | Mn (wt %) | Si (wt %) | Cr (wt %) | Mo (wt %) | Cu (wt %) |
|---|---|---|---|---|---|---|
| A | 0.08 | 0.55 | 0.30 | 3.2 | 0.08 | 0.20 |
| B | 0.08 | 0.60 | 0.32 | 3.5 | 0.35 | 0.23 |

| Steel | S (wt %) | P (wt %) | V (wt %) | Ti (wt %) | B (wt %) |
|---|---|---|---|---|---|
| A | 0.001 | 0.010 | 0.050 | 0.022 | 0.0020 |
| B | 0.001 | 0.012 | 0.13 | 0.024 | 0.0001 |

Figure 2:
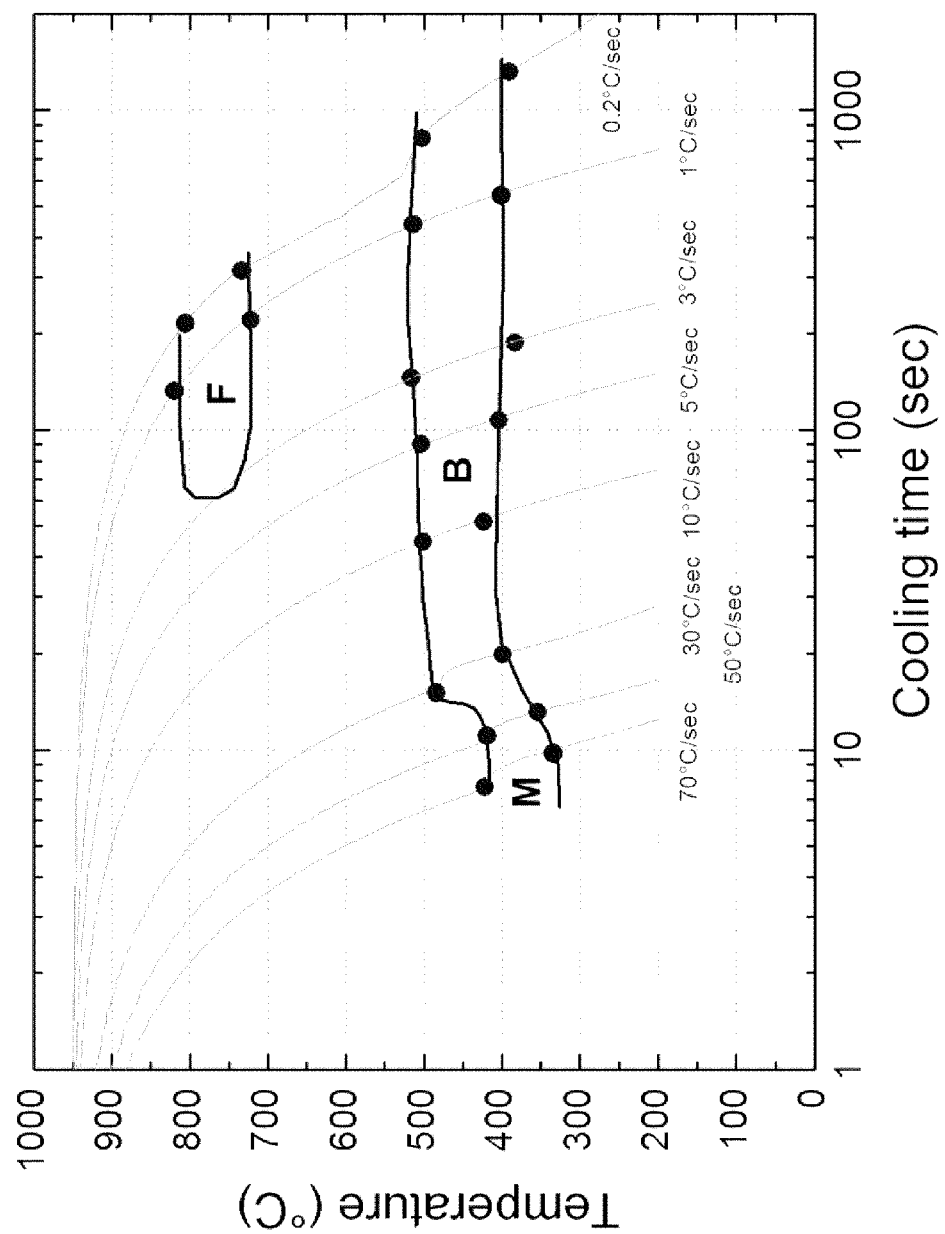
FIG. 2 illustrates a CCT diagram of Steel A with an austenitization at 920° C. for 10 min.

On Cooling Transformation:

The Continuous Cooling Transformation diagram (CCT) of Steel A is presented in FIG. 2. To construct the diagram, dilatometric tests were performed in a Gleeble 3500 thermo-mechanical simulator. The thermal cycles were composed of an austenitization at 920° C. during 10 minutes followed by cooling at a constant rate. Cooling Rates (CR) between 1° C./s and 70° C./s were explored. In all cases austenitic grain size prior to transformation was 15±5 µm.

Figure 3:
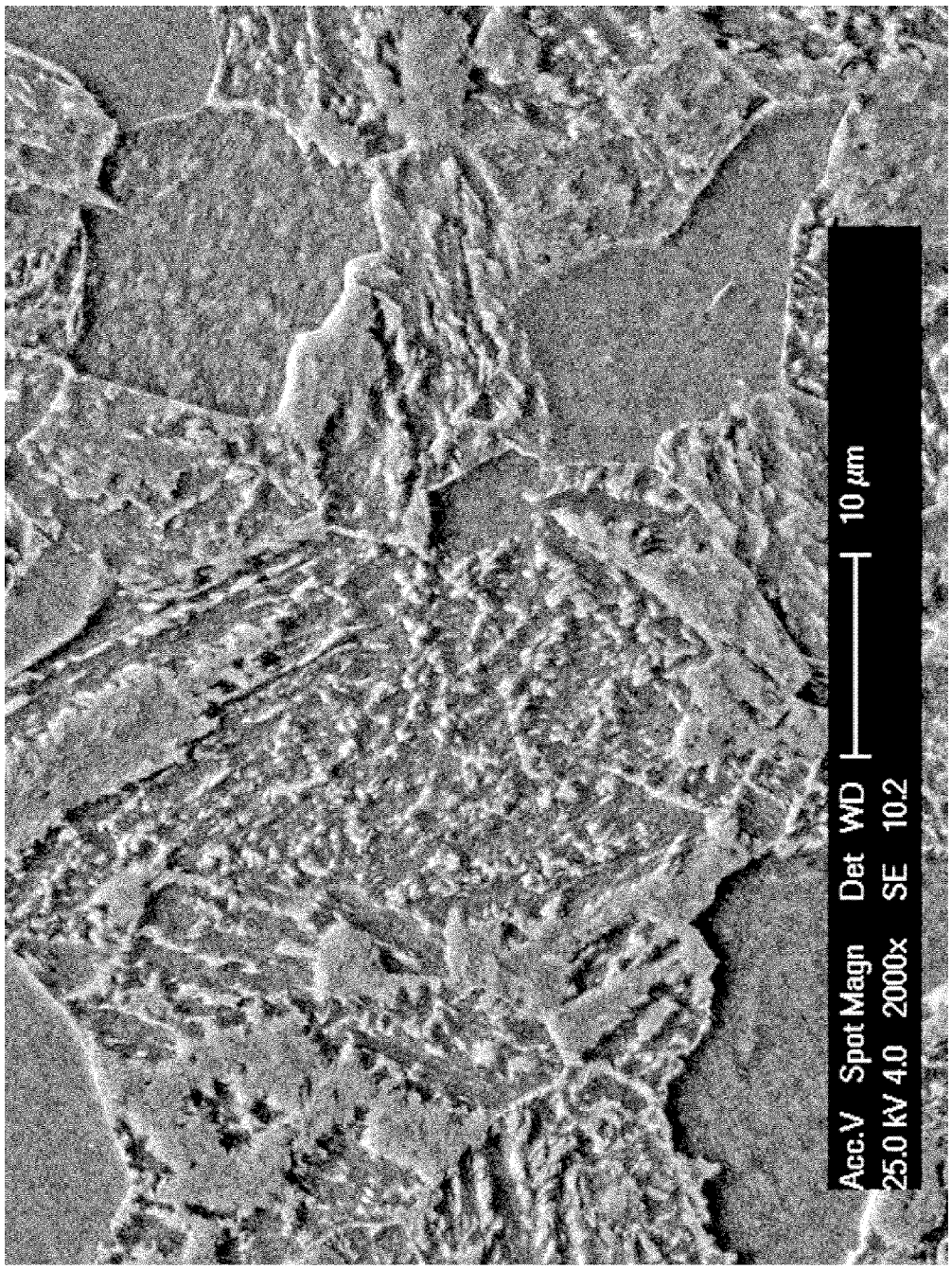
FIG. 3 illustrates the microstructure of Steel A cooled at 1° C./s observed using a scanning electron micrograph.

From the CCT diagram it is clear that when using cooling rates below 3° C./s, a mixture of polygonal ferrite and bainite is produced. An example of the microstructure obtained for CR=1° C./s is shown in FIG. 3. In this scanning electron micrograph, apart from the ferrite and bainite that form the major part of the microstructure, small regions of martensite-austenite (MA) constituent are also visible.

In spite of the low carbon content, the range of cooling conditions in which polygonal ferrite appears is restricted to CR<3° C./s. This is a consequence of the alloying additions, particularly the boron effect. The presence of polygonal ferrite may not be desired because it makes difficult to reach the high strength level required (YS>80 ksi). Additionally, the appearance of coarse granular bainite in combination with some MA blocks can impair toughness.

Figure 4:
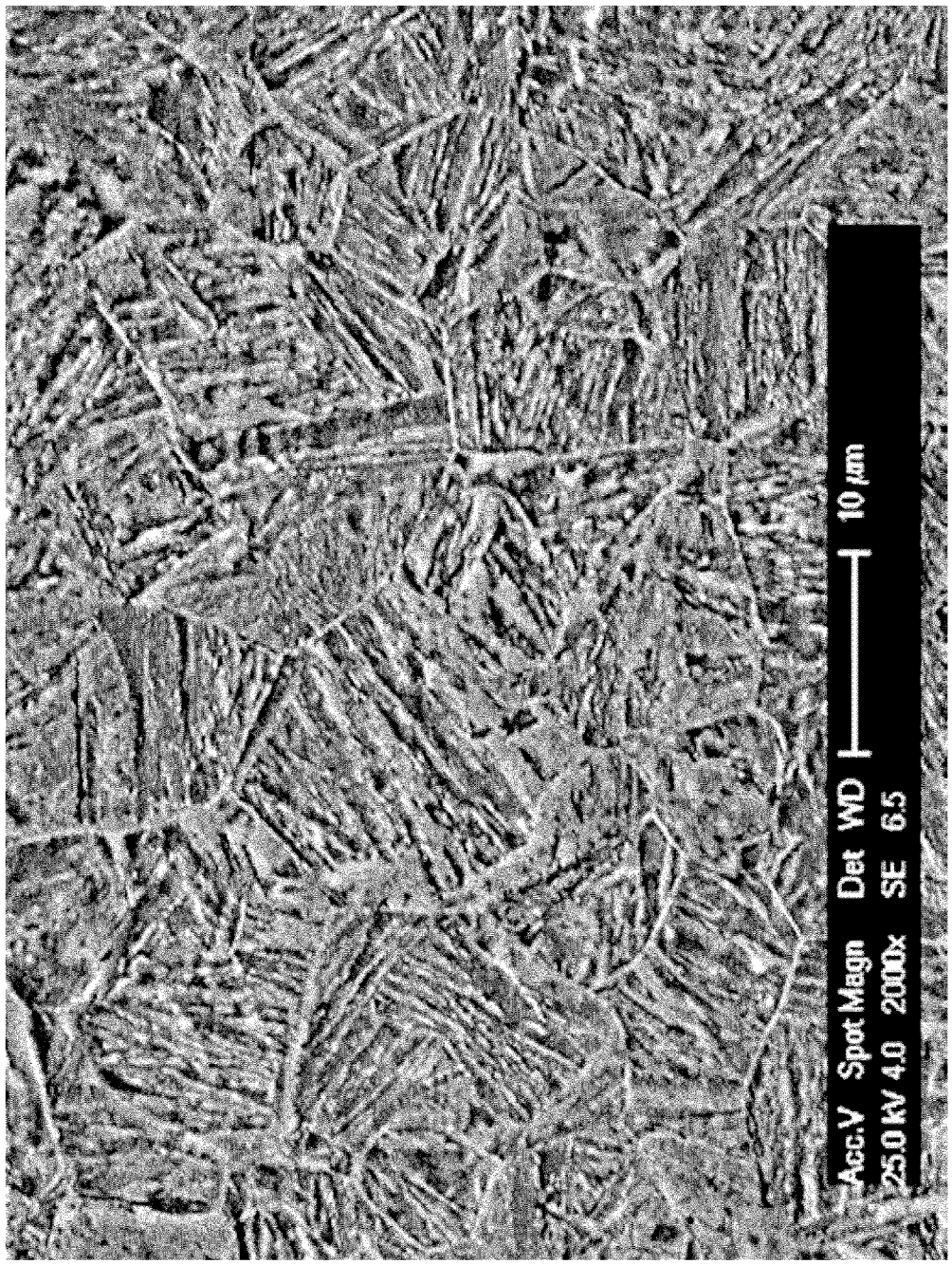
FIG. 4 illustrates the microstructure of Steel A cooled at 20° C./s observed using a scanning electron micrograph.

For cooling at rates between 10° C./s and 30° C./s, the main product microstructure is fine upper bainite. In some embodiments, martensite can also be present within this range of cooling rates. FIG. 4 is an example of a microstructure with a cooling curve of 20° C./s. Due to the low transformation temperature (below 550° C. from CCT diagram in FIG. 2), in combination with a higher cooling rate, the upper bainite is very fine. Even using optical and scanning electron microscopy, it is difficult to distinguish the fine upper bainite from tempered martensite.

Bainite formed at low temperatures is a target microstructure of the disclosure because it has high strength, acceptable toughness and good corrosion resistance. Preferably, the bainitic steel has a yield strength of at least about 80 Ksi (552 MPa) and a minimum absorbed energy in a Charpy V-notch impact test of 27 J at 0° C. (longitudinal direction, full size sample according to API 5CT, hereby incorporated by reference in its entirety.) Regarding the corrosion resistance, during the cooling transformation cementite is precipitated as part of the bainitic reaction. However, Cr is not partitioned into the carbide due to its limited diffusivity below 550° C. As a consequence almost all of the Cr is kept in solid solution, thereby improving corrosion resistance.

Although a microstructure fully composed of fine upper bainite has the desired properties in terms of strength, toughness and corrosion resistance, in some cases it is not possible to avoid the appearance of martensite during quenching. As will be described in the following paragraphs, when a mixture of martensite and bainite is formed during quenching, processing conditions have to be properly selected to minimize Cr-rich precipitation in martensite during tempering. As a result, good combinations of strength, toughness and corrosion resistance can also be obtained with mixtures of tempered martensite and bainite.

Figure 5:
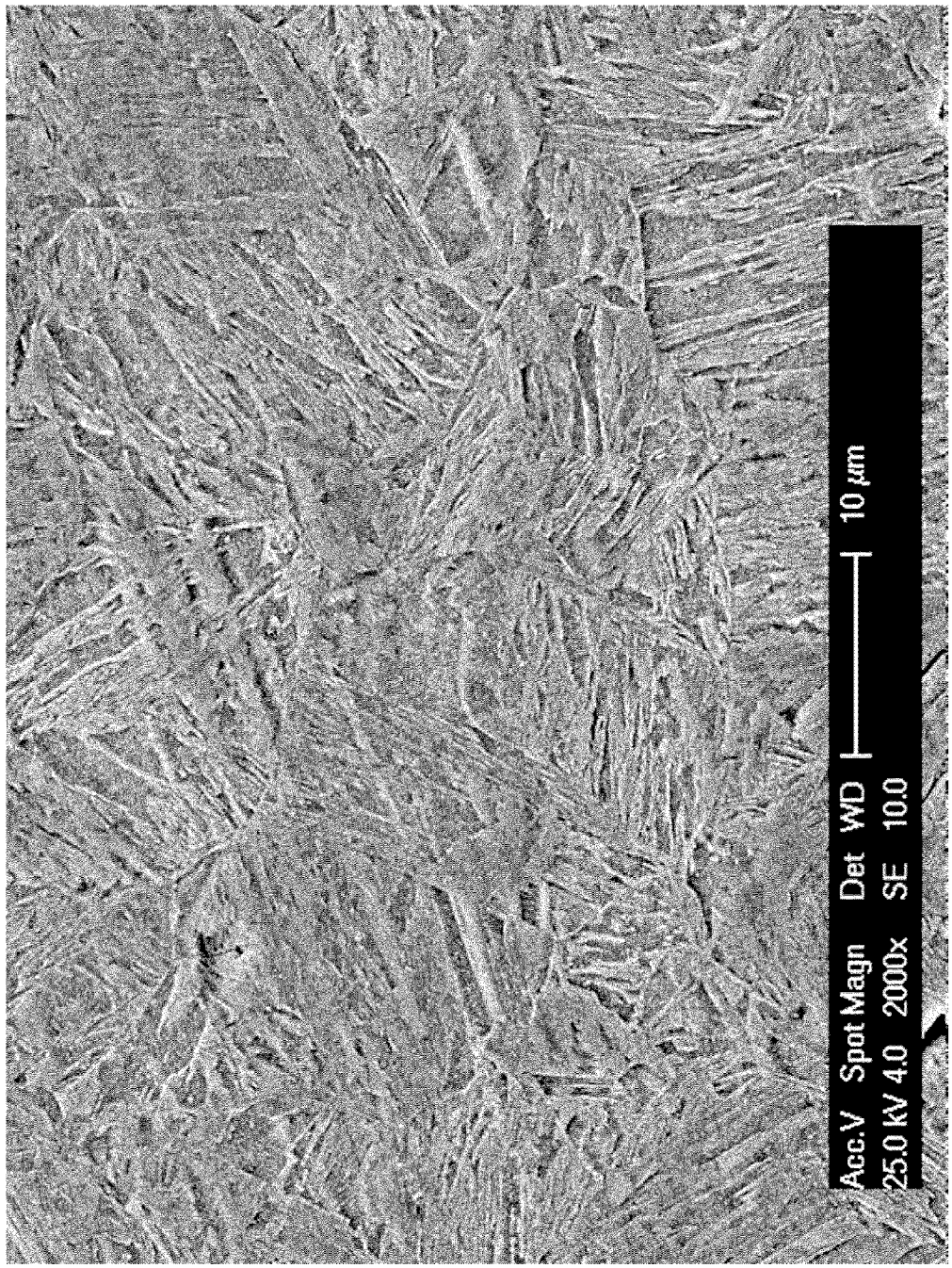
FIG. 5 illustrates the microstructure of Steel A cooled at 70° C./s observed using a scanning electron micrograph.

Martensite appears in the microstructure when cooling at rates higher than 10° C./s. The martensitic volume fraction increases gradually with CR, reaching about 50% at 30° C./s. FIG. 5 shows the microstructure corresponding to a cooling rate of 70° C./s, which is almost fully martensitic. When martensite is formed during cooling, subsequent tempering can be used to improve toughness of the steel. In the tempering treatment, Cr may be partially precipitated with carbon because of its high solubility in cementite. In order to avoid this loss of Cr in solid solution, high levels of stronger carbide forming elements (particularly V) were used in U.S. Pat. No. 6,648,991. In that case, due to the large microalloying addition, carbon is mostly fixed as vanadium carbides during tempering, avoiding the formation of Cr rich particles. However large V additions increase the alloy cost and strongly reduce productivity in the hot rolling mill. High V additions can also lead to cracking and other defects during the manufacturing of the steel.

However, the amount of costly elements, such as V, can be reduced. In order to avoid loss of Cr in solid solution during tempering, one option is to control cooling conditions to produce an as quenched structure composed of a large fraction of fine upper bainite. Another option is to control tempering conditions to avoid Cr-rich carbide precipitation. Regarding the first option, cementite formed during the low temperature bainite reaction are not enriched with Cr, because of its low diffusivity below 550° C. During subsequent tempering some Cr may diffuse from ferrite into cementite within the bainite, but this process is strongly limited due to the morphology of the microstructure. In upper bainite, cementite is precipitated as elongated carbides between ferritic sheaves. The spacing between carbides in this kind of lamellar structure can be about 300 nm (bainitic ferrite lath width). In order to produce a noticeable Cr depletion in the ferritic matrix due to diffusion towards the cementite, large holding times at high temperatures are needed. These temperature and time combinations during tempering are not consistent with the high strength required.

In some cases the appearance of martensite during quenching is unavoidable, for example in the case of thin-wall tubes quenched with water. When having a high proportion of martensite in the as quenched structure, the average Cr diffusion path to form precipitates during tempering is shorter (carbon is in solution and homogeneously distributed in martensite, so it is available to form a fine particle distribution). Therefore, in steels with mixtures of martensite and bainite (without large concentrations of strong carbide forming elements such as V) soaking times at high temperatures can be reduced during tempering to avoid a noticeable partition of Cr into the cementite.

Figure 6:
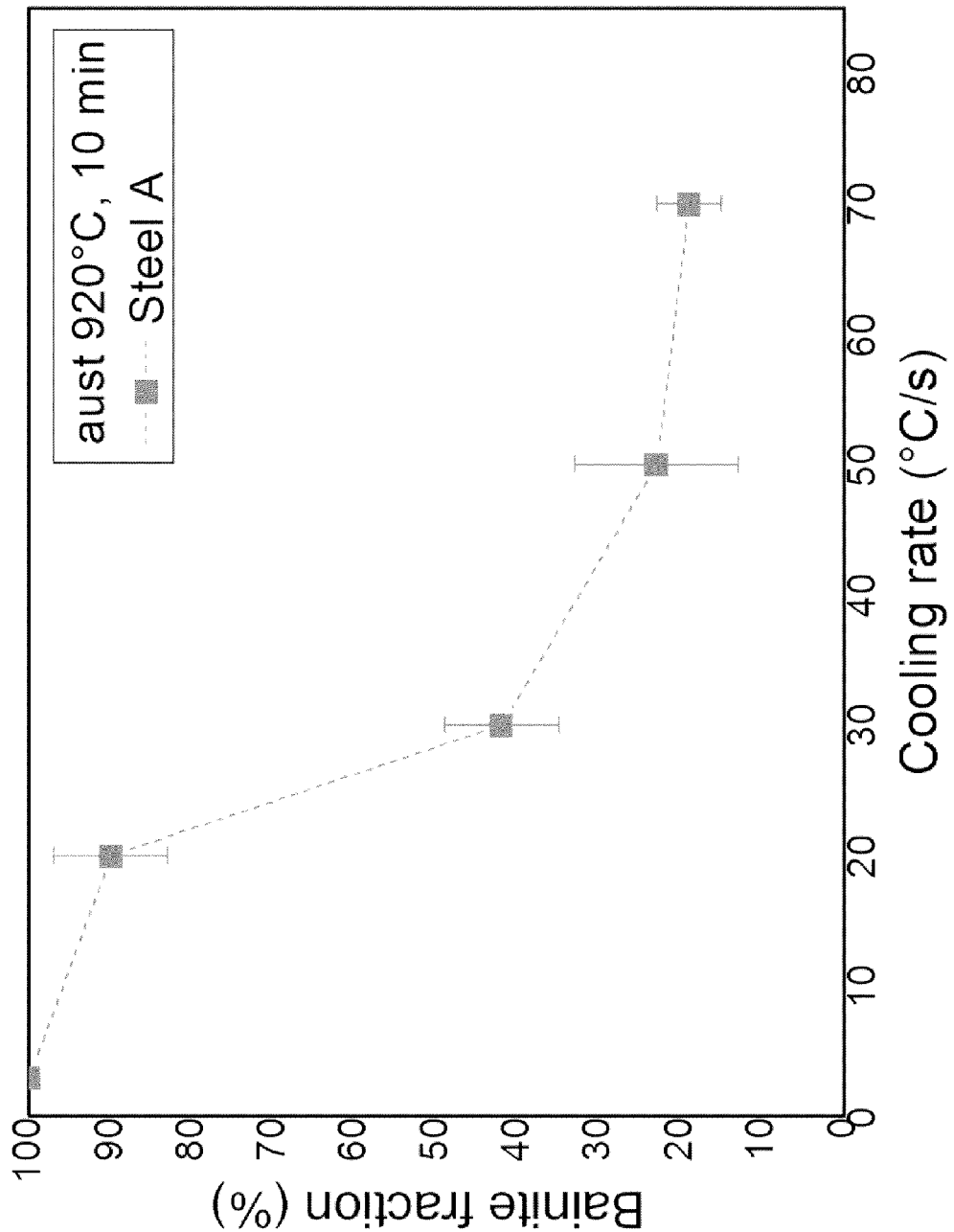
FIG. 6 illustrates the bainite volume fraction in Steel A as a function of cooling rate.

FIG. 6 illustrates the bainite volume fraction in Steel A as a function of cooling rate. To quantify volume fractions, a grid of 41×27 lines was imposed over 2000× SEM micrographs (for this magnification the grid consisted of 1107 squares of 1.5 μm sides). The quantification of bainite area fraction (equal to the bainite volume fraction) was performed manually in at least six fields selected randomly in the sample for each cooling rate. As the cooling rate increases, the bainite fraction decreases.

FIG. 6 shows that for Steel A, large proportions of upper bainite (>30%) are obtained when cooling at rates below 40° C./sec. More specifically, if the cooling rate during quenching is between 10° C./s and 30° C./s, the final microstructure is composed of more than 40% of bainite, the rest being martensite. Due to the low transformation temperature (below 550° C.) the upper bainite is refined, leading to a good combination of strength and toughness in the final product.

Figure 7:
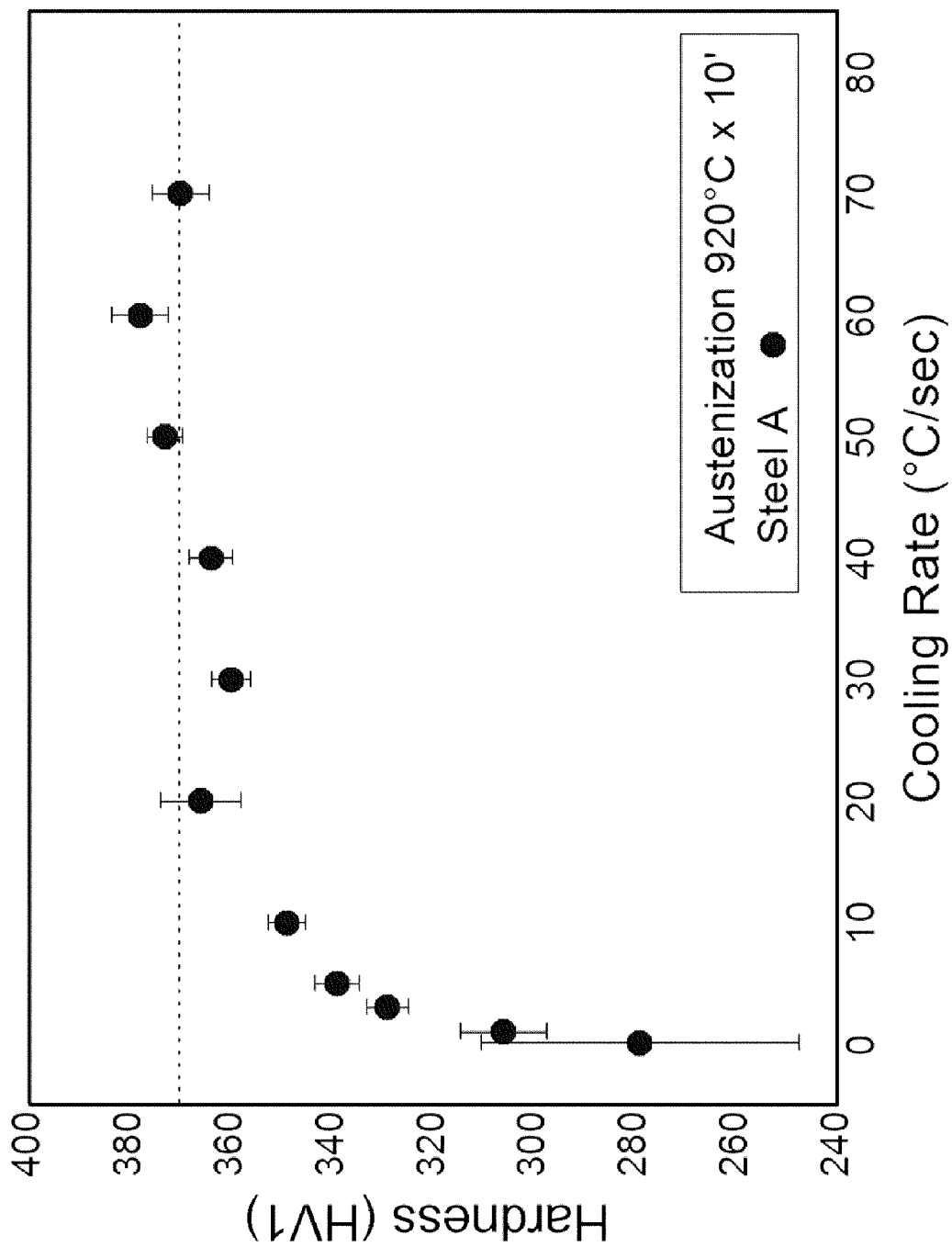
FIG. 7 illustrates the hardness of Steel A as a function of cooling rate.

FIG. 7 illustrates Steel A hardness as a function of the cooling rate. It is interesting to see that above 10° C./s there is a plateau in hardness (at about a 370 HV level), indicating that low temperature bainite and martensite strengths are almost similar.

Tempering:

When cooling at rates between 10° C./s and 30° C./s, Steel A presents an as quenched structure composed of bainite and martensite. Tempering can be used to increase toughness in the martensitic regions and to adjust mechanical properties.

Figure 8:
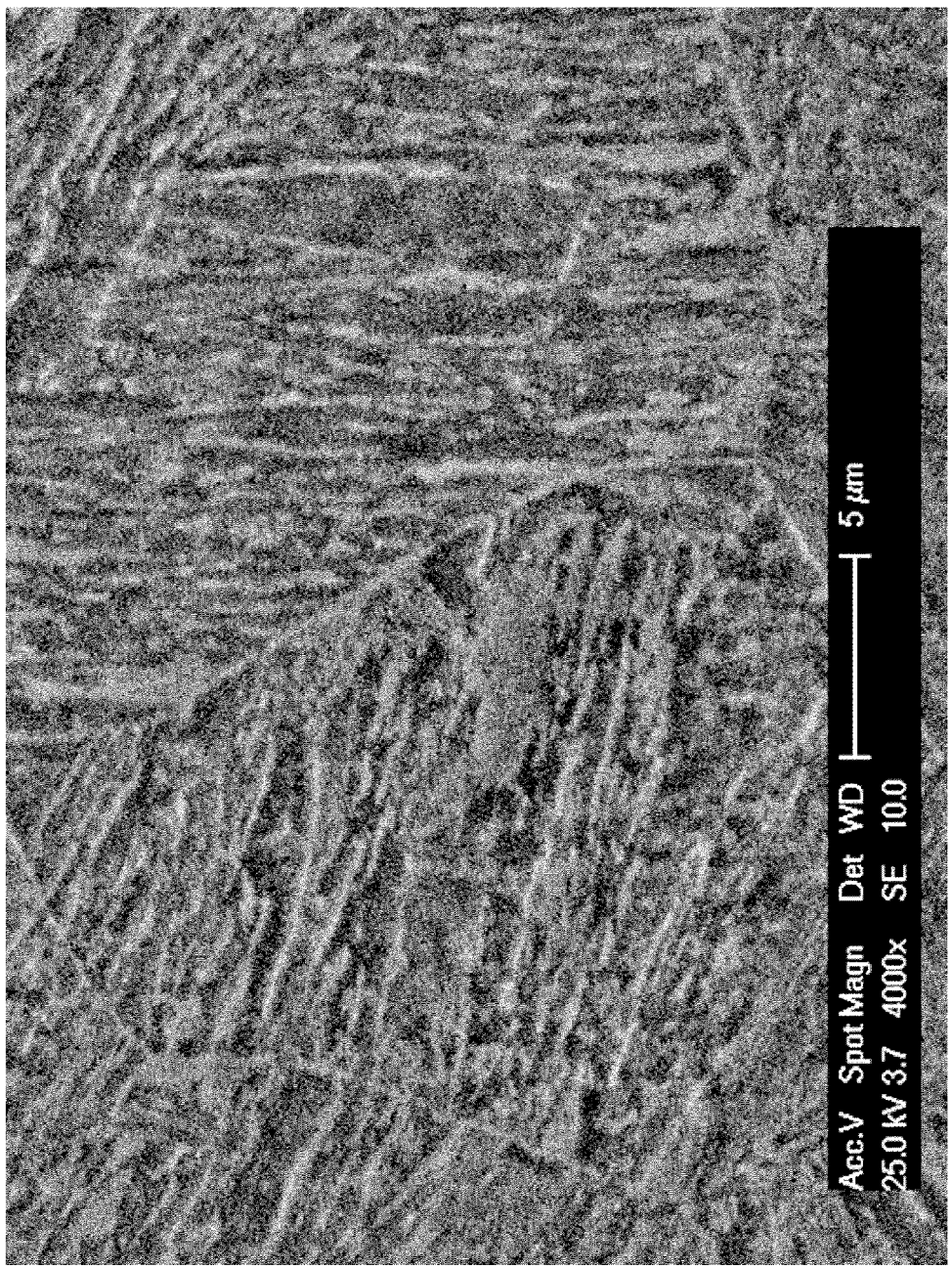
FIG. 8 illustrates the microstructure of Steel A austenitized at 920° C. during 10-20 minutes, cooled at 10-30° C./s, and tempered for 20-30 minutes at a temperature between 620° C. and 670° C.

FIG. 8 illustrates a micrograph corresponding to Steel A, wherein Steel A was industrially heat treated to reach a yield strength higher than 80 ksi. The steel was austenitized at 920° C. for 10-20 minutes, cooled at 10-30° C./s, and tempered for 20-30 minutes at a temperature between 620° C. and 670° C. The final microstructure is mostly composed of fine upper bainite. Obtained mechanical properties are presented in Table III.

Figure 9:
FIG. 9 illustrates the microstructure of Steel B after conventional quenching and tempering.

For comparison, FIG. 9 illustrates the conventionally quenched and tempered microstructure corresponding to Steel B, heat treated to reach a similar strength level as Steel A. In this case, the structure is tempered martensite with a fine distribution of V rich carbides. The corresponding mechanical properties are also presented in Table III.

TABLE III

Mechanical properties of Steels A and B. Impact tests were performed at 0° C. on full size samples taken in the LC direction. Shear area was 100% in both cases.

| Steel | YS (ksi) | UTS (ksi) | El (%) | CVN (Joules) |
| --- | --- | --- | --- | --- |
| A | 87 ± 1 | 98 ± 1 | 15.5 ± 0.5 | 220 ± 10 |
| B | 88 ± 2 | 100 ± 2 | 17.0 ± 1.0 | 240 ± 10 |

From Table III it is clear that in spite of the different final microstructures, the mechanical properties are very similar with respect to Steel A and B. Therefore, for example, vanadium can be reduced while still having desirable mechanical properties.

Corrosion Resistance in Mild Sweet Environments:

To evaluate the efficiency of the above disclosure, corrosion tests in simulated formation water (200 gr/lt NaCl, 25 mg/lt NaHCO$_3$) with the presence of CO$_2$ were carried out and are presented in this example.

Steels A and B were tested in 5 different conditions (see Table IV for details on testing parameters), and a third steel (Steel C, API L80 grade containing 0.23% C, 1.30% Mn and 0.40% Cr) was also included for comparison.

TABLE IV

Characteristics of corrosion tests presented in the example

| Test # | Type | Temperature (° C.) | CO$_2$ | Immersion time (day) | Details |
|---|---|---|---|---|---|
| 1 | Glass Cell | 25 | 1 bar continuous bubbling | 30 | Stirred |
| 2 | Glass Cell | 60 | 1 bar continuous bubbling | 30 | Stirred |
| 3 | Glass Cell | 80 | 1 bar continuous bubbling | 30 | Stirred |
| 4 | Autoclave | 120 | 1 bar partial pressure | 30 | Stirred |
| 5 | Rotating Cage | 120 | 3 bar partial pressure | 28 | 1000 rpm |

Figure 10:
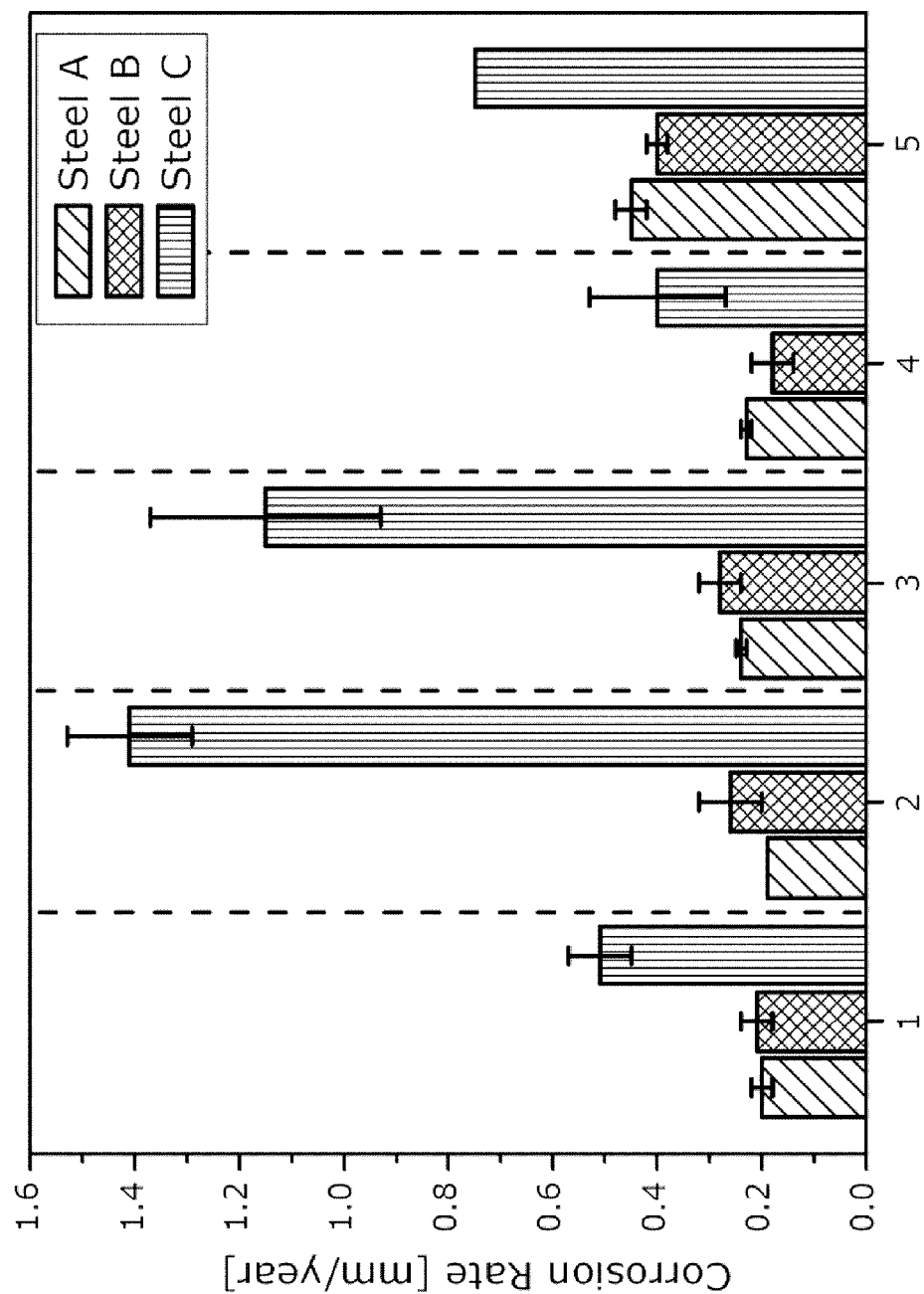
FIG. 10 illustrates the results of corrosion tests for described steels.

After testing, samples were chemically cleaned and corrosion rates were determined by weight loss. FIG. 10 summarizes the results of several tests of each type for Steels A, B and C. It can be seen that Steel A and B behave similarly among them in all type of tests; on the other hand, corrosion rates for Steel C are much higher in all conditions. No localized corrosion in the form of pitting was observed.

These results indicate that steels formed from the above disclosure retain the capacity of perform better than conventional carbon/low alloy steel in terms of resistance against sweet corrosion in mild environment.

Example 2

The next set of examples illustrates the corrosion performance of a steel manufactured from the above disclosure as compared to a higher carbon 3% Cr steel (alloy D in Table V). For this steel it was expected to have a lower concentration of Cr in solid solution than in Steel A. The higher carbon content of steel D increases precipitation of rich-Cr carbide during tempering. On the other hand, processing conditions of steel A encourage the formation of bainite. Furthermore, in Steel D there are no strong carbide formers (as V, Nb or Mo) to protect Cr from the mentioned precipitation.

TABLE V

Chemical compositions in weight percent of analyzed steels.

| Steel | C (wt %) | Mn (wt %) | Si (wt %) | Cr (wt %) | Mo (wt %) | Cu (wt %) |
|---|---|---|---|---|---|---|
| A | 0.08 | 0.55 | 0.30 | 3.2 | 0.08 | 0.20 |
| D | 0.17 | 0.40 | 0.31 | 3.4 | 0.05 | 0.06 |

| Steel | S (wt %) | P (wt %) | V (wt %) | Ti (wt %) | B (wt %) |
|---|---|---|---|---|---|
| A | 0.001 | 0.010 | 0.050 | 0.022 | 0.0020 |
| D | 0.001 | 0.010 | 0.007 | 0.004 | 0.0001 |

Figure 11:
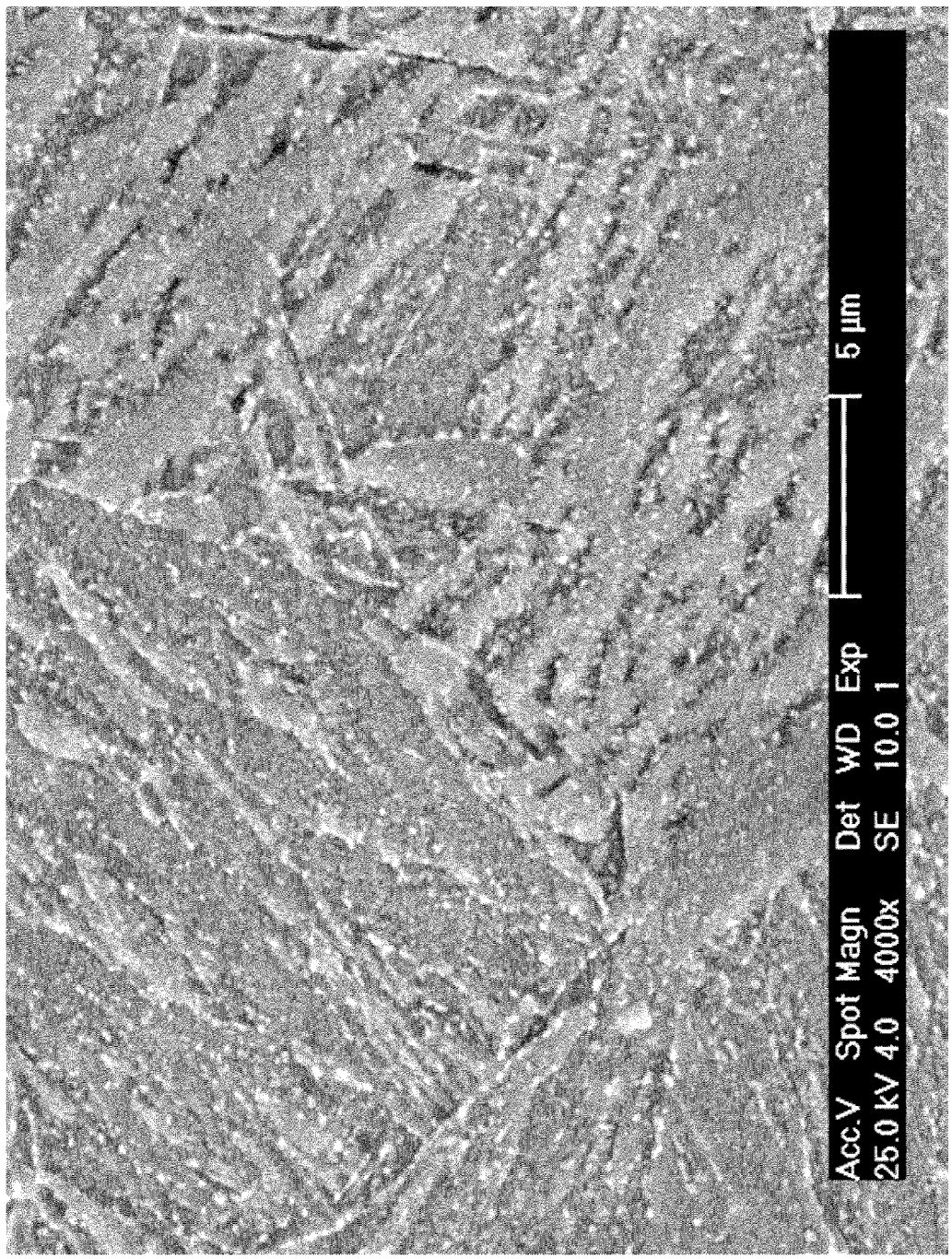
FIG. 11 illustrates the microstructure of Steel D after conventional quenching and tempering.

Both steels were heat treated to obtain similar strength level (Table VI). Steel D was quenched and tempered using a conventional treatment leading to a microstructure composed of fully tempered martensite (FIG. 11). Steel A was heat treated according to the above disclosure to obtain a final microstructure composed of a mixture of fine bainite and tempered martensite (FIG. 8).

TABLE VI

Tensile properties of Steels A and D.

| Steel | YS (ksi) | UTS (ksi) | El (%) |
|---|---|---|---|
| A | 87 ± 1 | 98 ± 1 | 15.5 ± 0.5 |
| D | 86 ± 1 | 99 ± 2 | 16.0 ± 1.0 |

Regarding corrosion resistance, Steels A and D were tested together in six different conditions simulating formation water (200 gr/lt NaCl, 25 mg/lt NaHCO$_3$) with the presence of CO$_2$ (Table VII). Using the same procedure as in previous example, samples were chemically cleaned after exposure and corrosion rates were determined by weight loss.

TABLE VII

Characteristics of corrosion tests presented in the example

| Test # | Type | Temperature (° C.) | CO$_2$ | Immersion time (day) | Details |
|---|---|---|---|---|---|
| 1 | Glass Cell | 25 | 1 bar continuous bubbling | 30 | Stirred |
| 2 | Glass Cell | 60 | 1 bar continuous bubbling | 30 | Stirred |
| 3 | Glass Cell | 80 | 1 bar continuous bubbling | 30 | Stirred |
| 4 | Autoclave | 120 | 1 bar partial pressure | 30 | Stirred |
| 5 | Rotating Cage | 60 | 3 bar partial pressure | 28 | 1000 rpm |
| 6 | Rotating Cage | 120 | 3 bar partial pressure | 28 | 1000 rpm |

Figure 12:
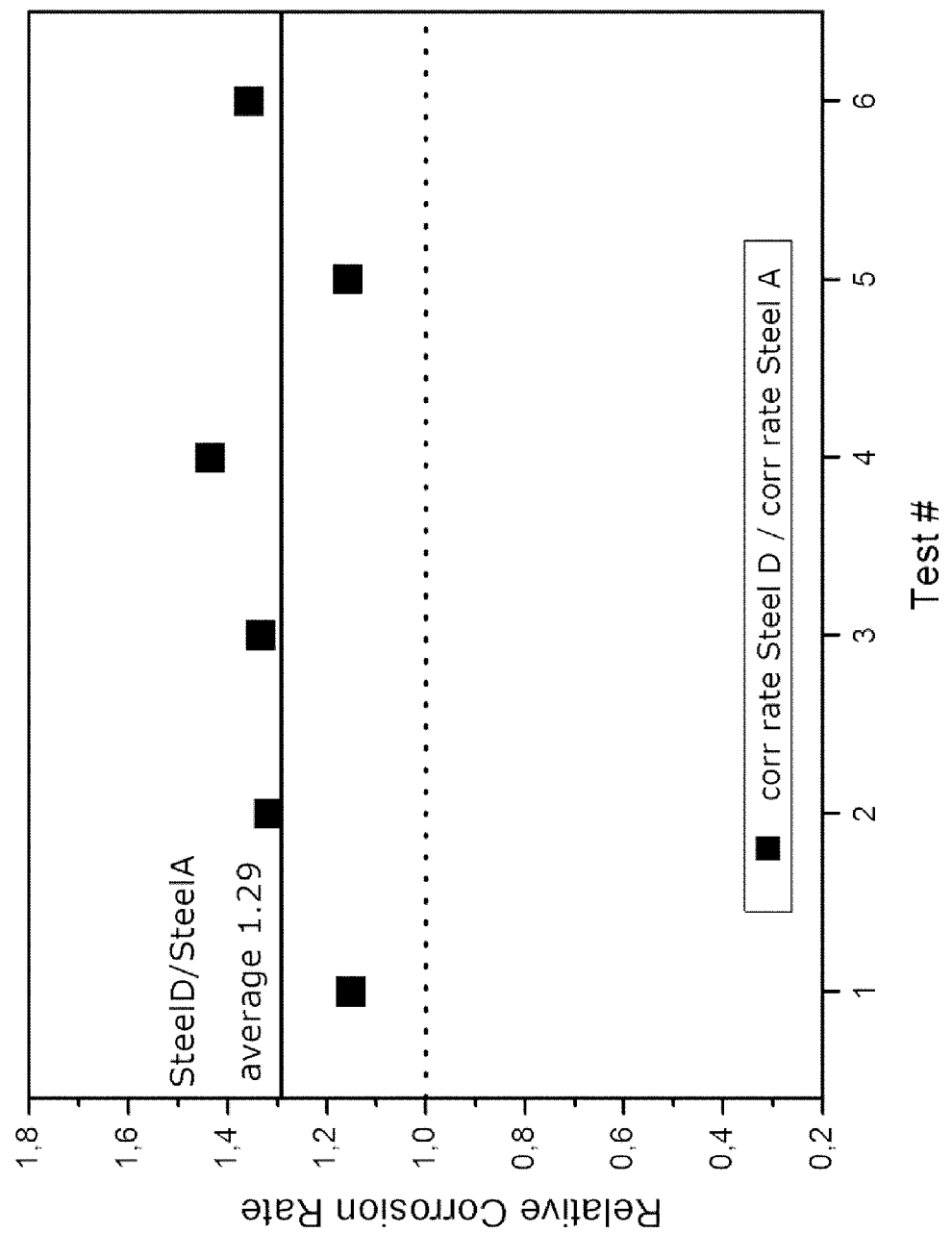
FIG. 12 illustrates the relative results from corrosion tests on steels D and A.

Steel D presented higher corrosion rates than the Steel A for all testing conditions, as shown in FIG. 12. Specifically, the value of the corrosion rate of Steel D divided by the corrosion rate of Steel A has an average value of about 1.29. Considering the average over different tests, the corrosion rate in the high carbon steel is about 30% higher than in Steel A in spite of the higher Cr addition in Steel D. These results can be understood considering the differences above mentioned regarding Cr in solid solution, which is expected to be higher in the steels manufactured from the above disclosure because of i) its chemistry design with lower carbon content and ii) its processing conditions that encourage the formation of bainite and minimize the formation of Cr rich carbides.

Embodiments of the above disclosure can produce a steel comprising a mixture of bainite and martensite. Depending on the tube wall thickness, approximately 5-10% bainite (for thinner products and high cooling rates during quenching, e.g. 50° C./s or greater) to almost full bainite (for thicker products and low cooling rates, e.g. 10-20° C./s) can be formed in the steel tubes. The desired properties, such as yield strength and corrosion resistance, can be achieved in all of the above examples as the formation of coarse bainite and ferrite are avoided. Coarse bainite and ferrite tend to form when the cooling rate during quenching is lower than 10° C./s. Additionally, when the martensite volume fraction is high (such as for thinner products) tempering temperatures and time should be kept as low as possible while still being consistent with the range of desired mechanical properties in order to avoid the formation of Cr rich carbides.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A seamless steel pipe comprising:
a composition comprising:
0.06-0.10 wt. % carbon;
1.5-4.5 wt. % chromium;
0.3-0.8 wt. % manganese;
0.20-0.35 wt. % silicon;
0 to 0.55 wt. % molybdenum;
0 to 0.06 wt. % vanadium;
0 to 0.3 wt. % copper;
0.01-0.03 wt. % titanium;
0.0001 to 0.0025 wt. % boron
0 to 0.08 wt. % niobium; and
the remainder being iron and inevitable impurities; and
a final microstructure comprising a mixture of tempered martensite and upper bainite;
wherein the final microstructure of the pipe comprises at least 5 volume % bainite;
wherein approximately 85 wt. % or more of the chromium is kept in solid solution; and
wherein substantially all of any retained austenite is decomposed.

2. The seamless steel pipe of claim 1, wherein ferrite laths in the upper bainite have a thickness of approximately 300 nm or less.

3. The seamless steel pipe of claim 2, wherein the ferrite laths have a thickness of approximately 200 nm or less.

4. The seamless steel pipe of claim 1, wherein the pipe has approximately one half to one third of the $CO_2$ corrosion resistance of a conventional carbon steel in a mild $CO_2$ aqueous environment.

5. The seamless steel pipe of claim 1, wherein the pipe has no failures in a Method A NACE TM 177 test, in Region 1 of ISO 15156 part 2.

6. The seamless steel pipe of claim 1, wherein the pipe as quenched has a hardness of approximately 370 HV1.

7. The seamless steel pipe of claim 1, wherein the pipe has a corrosion rate of approximately 0.2 mm/year in a 200 gr/lt NaCl, 25 mg/lt $NaHCO_3$ environment at a temperature of about 60° C.

8. The seamless steel pipe of claim 1, wherein the pipe further comprises:
a yield strength greater than about 80 ksi;
ultimate tensile strength greater than about 98 ksi;
elongation greater than about 15.5%; and
a minimum absorbed energy in Charpy V-notch impact test of 27 J at 0° C.

9. The seamless steel pipe of claim 1, further comprising:
less than 0.005 wt. % sulfur; and
less than 0.018 wt. % phosphorus.

10. The seamless steel pipe of claim 1, comprising:
3.0-4.0 wt. % chromium;
0.4-0.65 wt. % manganese;
less than 0.004 wt. % sulfur;
0.25-0.35 wt. % silicon;
0.02-0.06 wt. % vanadium;
0.01-0.25 wt. % titanium;
0.0005 to 0.0020 wt. % boron; and
0 to 0.04 wt. % niobium.

11. The seamless steel pipe of claim 1, wherein the final microstructure comprises at least 30 volume % bainite.

12. The seamless steel pipe of claim 11, wherein the final microstructure comprises at least 40 volume % bainite.

13. A method of manufacturing a seamless steel pipe comprising:
providing a steel composition comprising:
0.06-0.10 wt. % carbon;
1.5-4.5 wt. % chromium;
0.3-0.8 wt. % manganese;
0.20-0.35 wt. % silicon;
0 to 0.55 wt. % molybdenum;
0 to 0.06 wt. % vanadium;
0 to 0.3 wt. % copper;
0.01-0.03 wt. % titanium;
0.0001 to 0.0025 wt. % boron;
0 to 0.08 wt. % niobium; and
the remainder being iron and inevitable impurities;
austenitizing the steel composition at a temperature high enough to dissolve substantially all iron and chromium rich carbides and low enough to obtain an austenitic grain size prior to quenching of 20 μm or less;
quenching the steel composition at a rate to produce a microstructure comprising a mixture of martensite and fine upper bainite comprising alternating ferrite plates and elongated iron carbides, and at a rate where austenite decomposition proceeds below 550° C.; and
tempering the steel composition to form tempered martensite and upper bainite using low temperature and soaking time in order to keep approximately 85 wt. % of the chromium in solid solution;
wherein a final microstructure of the pipe comprises at least 5 volume % bainite; and
wherein substantially all of any retained austenite is decomposed.

14. The method of claim 13, wherein the austenitic grain size prior to quenching is approximately 15 μm or less.

15. The method of claim 13, wherein the steel is quenched at a rate greater than about 10° C./sec.

16. The method of claim 13, wherein the steel composition comprises:
less than 0.005 wt. % sulfur; and
less than 0.018 wt. % phosphorus.

17. The method of claim 13, wherein the steel composition comprises:
3.0-4.0 wt. % chromium;
0.4-0.65 wt. % manganese;
less than 0.004 wt. % sulfur;
0.25-0.35 wt. % silicon;
0.02-0.06 wt. % vanadium;
0.01-0.25 wt. % titanium;
0.0005 to 0.0020 wt. % boron; and
0 to 0.04 wt. % niobium.

18. The method of claim 13, wherein the final microstructure comprises at least 30 volume % bainite.

19. The method of claim 18, wherein the final microstructure comprises at least 40 volume % bainite.

* * * * *